Nov. 4, 1952 W. O. BAZHAW 2,616,177
APPARATUS AND METHOD OF SURVEYING ELEVATIONS
Filed Nov. 3, 1947
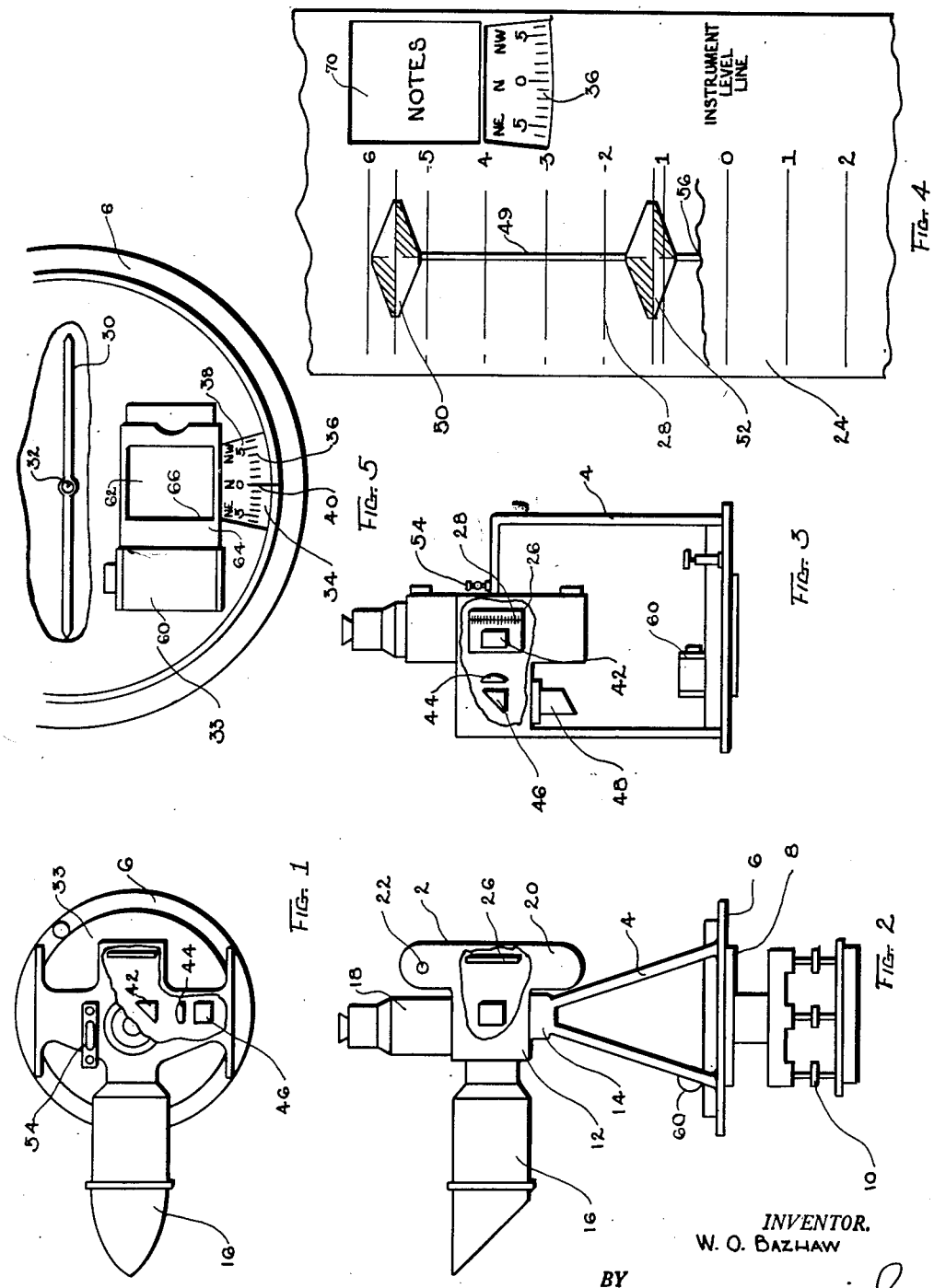
INVENTOR.
W. O. BAZHAW
BY
C. M. McKnight Patented Nov. 4, 1952

2,616,177

UNITED STATES PATENT OFFICE 2,616,177

APPARATUS AND METHOD OF SURVEYING ELEVATIONS

Willis O. Bazhaw, Tulsa, Okla.

Application November 3, 1947, Serial No. 783,785

10 Claims. (Cl. 33—1)

This invention relates to a method and apparatus for determining elevations of a terrain and more particularly, but not by way of limitation, to a combination topographic camera and bearing indicator.

The invention is applicable for a wide field of uses where it is desirable to expediously and efficiently determine elevation contours for topographic maps adapted for use in geophysical, seismographic, and other similar types of surveying work.

The present invention more or less obviates the old method of determining elevations in a terrain such as surveying the terrain with a transit, chain and rod for a particular traverse.

The present apparatus and method photographs the variable elevations directly onto the film in a series of shots simultaneous with the bearing direction indications after which the film with the plurality of shots is developed and the readings indicated on the film are computed to provide the elevation of the terrain in feet, or like units of measure.

It is an important object of this invention to positively indicate the elevations of a terrain during a traverse survey and particularly to eliminate the error of the human element normally involved in such surveying practice.

A further object of this invention is to indicate variable elevations of a terrain during a traverse survey wherein a permanent record is provided and accurate determination can be computed therefrom.

And still another object of this invention is to provide a topographic camera of simple and practical construction whereby a photographic print or record may be easily and quickly obtained in order to determine the elevation of the terrain.

And still another object of this invention is to provide an apparatus of the above character which may be conveniently operated, is of light and compact construction, durable and may be inexpensively manufactured and economical to operate.

A further object of this invention is to improve the method of taking elevations of a terrain, and particularly to increase the speed and accuracy of the field operations, wherein the accuracy is obtained by reducing the possibility of error to a minimum by the elimination of various readings, such as: rod readings, stadia distance, vertical angle, and horizontal angle or directional scale readings normally required in other surveying methods. The elimination of these various readings from field notes at each setup provides a corresponding saving in time.

And still another object of this invention is to provide a topographic camera to provide positive indications of terrain elevation wherein a permanent photographic record is obtained in each photographic shot, thereby eliminating any future field re-runs when future reference data is required.

And still another object of this invention is to provide a topographic camera for determining elevation contours, which is simple in operation, capable of easy and quick apprehension, thereby eliminating considerable instruction time normally required in other surveying instruments.

Other objects and advantages of the invention will be evident from the following detailed description, read in conjunction with the accompanying drawings, which illustrate my invention.

In the drawings:

Figure 1 is a plan view of the apparatus.

Figure 2 is a side elevation of the topographic camera.

Figure 3 is a rear view of the camera shown in Figure 2 with certain parts omitted for clarity.

Figure 4 is a front or plan view of a fragmentary portion of the film after a shot has been taken.

Figure 5 is a fragmentary plan view of the camera support plate showing the magnetic compass and the window indicator of the compass card for the bearing indications.

Referring to the drawings in detail, and more particularly to Figures 1 to 4 inclusive, reference character 2 designates the topographic camera generally which is adapted to be supported by a pair of angular spaced brackets 4 in turn supported on a circular plate 6 mounted on a horizontally disposed flange 8 carried by the leveling head 10 adapted to be mounted on the usual tripod members (not shown). The camera body 12 is disposed on the solid portion 14 of the brackets 4, and is provided with a horizontally disposed tube or telephoto lens 16. A vertically disposed sight member 18 extends from the upper portion of the body 12 of the camera and cooperates with the telephoto lens in any suitable manner, such as a reflecting mirror or the like (not shown). The camera 2 is provided with a rear lens housing 20 in which is embodied a conventional camera mechanism of any suitable type (not shown). The housing 20 contains a roll member 22 for manually moving the film 24, a portion of which is shown in Figure 4. The film 24 is manually rotated in the camera in the usual manner. A scale 26 is disposed in the focal plane of the camera in fixed relation with the housing and film. The scale comprises a glass slide upon which is disposed a mil scale 28 shown photographed on the film 24 in Figure 4, for indicating on the film particular vertical distances in millimeters, as will be hereinafter set forth. The glass scale is preferably held in the casing by any suitable holder or bracket member (not shown), and the slide is preferably, but not limited thereto, disposed about .002 of an inch in front of the film, as shown in Figure 2.

Referring to Figure 5, the sectional support plate 6 is provided with a magnetic compass 30 pivoted at 32 and disposed on the under side of lid 33 of the plate 6. A circular shaped compass card 34 is encased in the sectional plate 6 under the lid, and is connected with the rotatable pivot shaft 32 of the compass 30. The card 34 is provided with a plurality of bearing indications 36 designating degrees, minutes and seconds in the usual manner. The connection between the compass 30 and the compass card 34 is such that when the compass rotates to indicate a bearing indication, the card 34 rotates simultaneously to bring the bearing indications 36 in display with a window 38 provided in the lid 33 of the sectional plate 6. The window 38 is provided with an index line 40 in order that the bearing indications 36 can be read directly from the compass card through the window 38.

From Figures 1 and 3, it will be noted that the camera 2 is provided with a small prism 42 cooperating with a lens 44 mounted in the camera body 12 which in turn cooperates with a prism 46. The prism 46 is disposed in the camera body 12 in alignment with a vertical tube or sight 48 extending downwardly from the housing 12, and disposed directly above in vertical alignment with the window 38 of the compass card 34. From the above it will be apparent that the camera functions to take a horizontal shot or picture in the direction determined by the telephoto lens 16, and simultaneously photographs the bearing indications 36 of the compass card 34 indicated at the window 38. This simultaneous exposure or photograph is accomplished through the tube 48, prism 46, lens 44 and prism 42 focused onto the camera film.

In Figure 4, a fragmentary portion of the photographed and developed film is shown slightly enlarged, and from which it will be noted that the mil scale, as indicated at 28, is portrayed thereon, along with the bearing indications 36 immediately adjacent the vertical plane of the mil scale 28.

In order to positively indicate the elevations of the terrain, and particularly during a traverse survey, a vertical upstanding rod 49, as indicated on the developed film 24, is utilized. The rod is provided with a plurality of vertically spaced target members indicated on the developed film 24 as 50 and 52. The rod 49 is any suitable standard, and is provided with the upper target 50 in vertical spaced relation with the lower target 52, and at a fixed distance therebetween. In practice it has been found that certain materials photograph better than others, especially in relationship with the sun, and it is preferable, but not limited thereto, that the targets be composed of a translucent opal plastic, such as any plastic or Plexigas having a milky white finish in order to provide a clear exposure on the film.

Operation

In order to photograph the elevations of a terrain, the rod 49 with the upper and lower targets at pre-determined spaced distances between them, is photographed by the camera. The rod may be disposed at any one of variable distances from the camera. In taking the photographic shot, the camera is provided with a level bubble 54 in Figure 1 in order to assure that the camera is always disposed at a substantial level position during the photographing of the target members. The operator sights through the tube 18 to bring the rod 49 in line of sight with the tube 16 thereby photographing a shot at the rodman and providing a complete picture of the rod from the top target 50, the lower target 52 and in some instances the horizontal line of the terrain indicated at 56 on the exposed film 24 in Figure 4. Simultaneous with the taking a shot of the targets on the rod 49, the bearing indication from the window 38 is also photographed on the film, as shown in Figure 4. Upon taking the photographic shot the distance from the zero point on the mil scale, which represents the height of the instrument 2, to that of the top target 50 is taken, and indicated on the film 24 by the mil scale 28 in millimeters. Furthermore, the fixed distance between the targets 50 and 52 as relates to the mil scale 28 will vary with the distance that the rod 49 is from the camera 2. It will be apparent that the greater the distance the rod is away from the camera, the smaller the intercept distance between the targets 50 and 52, as indicated on the mil scale 28, and conversely the shorter distance between the rod 49 and the camera, the larger the intercept distance will be shown photographed on the film 24. As a practical example, if the fixed distance between the targets 50 and 52 is 8 feet, and the distance from the rod to the camera is approximately 1,000 feet, then the intercept distance between the targets will be disclosed on the film as approximately 3.20 millimeters measured from the mil scale, while on the other hand, if the targets and rod 49 are substantially closer to the camera, approximately 200 feet, the intercept distance between the targets as indicated on the mil scale may be increased to 16.00 millimeters. It will thus be apparent that the intercept distance as indicated on the film 24 in millimeters is variable dependent upon the distance of the target from the camera. In order to take a traverse survey, the operator for the topographic camera will take shots on a one-half traverse. For example, he will take a back shot at a certain distance from the target. The rodman or targetman will then move around the same distance in front of the camera so that the instrument man may take a front shot. The instrument operator then moves the topographic camera twice the distance from the rodman in order to repeat the operation. As a practical example, the instrument operator on a one-half traverse will take a back shot at one-quarter of a mile at the target. The rodman or target man will then move one-half a mile in order to allow the instrument man to take a one-quarter front shot. The instrument or camera operator than moves one-half mile forward relative to the rodman and takes a back shot of one-quarter mile distance. This operation can be continued until the complete contour or terrain of the traverse desired is photographed and a complete traverse is made. It will be apparent that the film 24 is rotated manually in the camera 2 after each shot is taken in order to provide a different exposure for each shot.

After any complete or desired traverse is photographed, the film 24 is developed and the various shots of the traverse are examined under a microscope, or the negatives may be enlarged in order that computation may be made direct therefrom, and thus obtain accurate knowledge of the elevation for a particular terrain. An important feature of the present invention is that the topographic camera is always maintained and set for a level position with the horizontal by the level bubble 54 during all photographic shots. The camera never takes any vertical angle shots, such as is in a transit survey, or in the ordinary conventional type of survey. The lens in the camera 2 may be variable, but is preferably fixed to allow for a plus or minus five degrees variation in vertical angles, thereby assuring a ten degree differential in the vertical angle range. This is important irrespective of whether the terrain is hilly or level since the topographic camera is set for a level shot and the lens in the camera always photographs onto the film within a 10 degree vertical range. It has been found in practice that this is a sufficient vertical angle range for normal work at all times. The present instrument photographs the various elevations directly to the film 24, simultaneous with the bearing direction indications. The film may be developed and computed to give you the elevation of the film in feet. The mil scale indicating millimeters on the film is preferably utilized for convenience with the film rather than feet.

After the film is developed, the computator takes the readings from the film to determine the intercept distance between the targets 50 and 52 as well as the distance between the top target 50 and the zero mil scale line which is always disclosed on the film. With these known factors in millimeters, the intercept distance between the targets 50 and 52 as indicated on the mil scale 28 of the film 24 is divided into the elevation distance between the top target 50 and the zero mil scale line. The above quotient as indicated by the fixed intercept distance between the targets divided into the elevation distance between the top target and the zero mil scale line is then multiplied by the fixed distance originally between the two targets 50 and 52 in feet on the rod 49 which will provide the difference in elevation where the camera is set up to take the shot, and the disposition of the rod 49. Simultaneous with the determination of this elevation, the directional bearing of that particular shot is also photographed on the film.

It will be apparent that in some instances, particularly hilly country, it may be desirous to utilize a third target disposed midway between targets 50 and 52 in addition to the original two targets, particularly where the bottom target cannot be normally seen in taking the shot. In such instances, the measurement is photographed between the middle target (not shown) and the top target. In using a third target it is preferable to paint or construct it of some different design, so that it can be readily apparent that it is the third target, and is disposed at the half way point between the two original targets, thereby indicating to the operator that he is only shooting a one-half intercept distance. However, it will be apparent that it is necessary for any photographic shot to be able to sight at least two targets or a single target having spaced indications thereon for a distance computation and determination of the elevation at that point. However, in normal level terrains it is only necessary to utilize the upper and lower target wherein the indication is made between the top and bottom targets.

The developed film will give all the information needed to determine the elevation at each station set-up where a shot is taken. The vertical angle range that can be accommodated by the instrument, and when in a level position is determined by the focal length of the telephoto lens 16 used with the camera 2. In computing the elevation differences, the following equation is used:

$$\text{Elevation Difference} = H/i \times R$$

"H" is the interval or distance measured on the film from the zero or instrument level line to the top target on the rod 49. "i" is the intercept distance or interval intercepted on the film between the fixed targets and is a function of the distance for the given lens and target spacing. "R" is the actual or fixed target interval measured between the targets on the rod itself, and is usually in feet, and is the conversion constant. If "H" and "i" are in millimeters and "R" is in feet, then the elevation difference will be in feet.

In order to compute the distance from the camera or instrument to the position of the rod, the following equation is used:

$$D = f/i \times R$$

Where "D" is the distance between the camera and the position of the rod, "f" is the focal length of the lens utilized with the camera and is in the same unit of measure as that of "i." "i" and "R" are the same as set forth supra.

A housing 60 is secured to the lid 33 and contains note paper 62 which is adapted to roll through a guide bracket 64 having a window 66. Any notes desired may be written on the paper 62, and as noted in Figure 3, the window 66 is in partial alignment with the tube 48, whereby any written notes will photograph on the film 24 adjacent the bearing reading as shown at 70.

From the foregoing it will be apparent that the present invention contemplates an apparatus and method of surveying elevational terrains for any type of contour wherein spaced targets at any variable distance from the camera are photographed relative to a simultaneous photographing of the spaced distance from the target image and the height of instrument line. The photographing of the targets provides the intercept interval, preferably but not limited thereto in millimeters as units of measure in order to provide a basis for computation of the elevation relative to a known fixed distance provided by the targets. Simultaneous with the photographing of the above intercept intervals the topographic camera also photographs the bearing indications of the particular set up or position of the targets. Furthermore, the present invention contemplates a method and apparatus of determining elevations in a terrain which saves considerable time and is efficient and accurate, and more particularly, is an innovation over the present day methods of surveying.

Changes may be made in the specification and drawings without departing from the spirit of the invention within the scope of the following claims, as set forth.

What I claim is:

1. In a combination apparatus comprising a photographic camera and a bearing compass therewith, a sighting lens for the camera, means for leveling the lens in a substantially horizontal plane, said lens adapted to sight a pair of distant targets disposed in known positions on a rod of known length and having a known vertical interval therebetween, a scale having units of measure thereon provided in the camera and in alignment with the lens, said scale indicating on the photographed film the intercept interval between the targets relative to the distant position thereof, said scale simultaneously indicating on the film the intercept interval between a horizontal plane parallel with the line of sight of the camera and the uppermost target, a compass card connected with the bearing compass, and means for simultaneously indicating on the film the bearing indications from the compass card.

2. In a combination apparatus comprising a camera and a bearing compass, a sighting lens for the camera, means for leveling the lens in a substantially horizontal plane, said lens adapted to sight a pair of distant targets disposed in known positions on a rod of known length and having a known vertical interval therebetween, a scale having millimeter indications of measure thereon provided in the camera and in alignment with the lens, said scale indicating on the film the intercept interval between the targets relative to the distant position from the camera, said scale simultaneously indicating on the film the intercept heighth interval between a plane parallel with the optical center of the sighting lens and the uppermost target, a compass card connected with the bearing compass and adapted to pivot therewith, and prism and lens means for simultaneously indicating on the film the bearing indications of the compass card for the distant position of the targets.

3. In combination with a camera for photographing elevations, a bearing compass and a supporting plate therefor, a sighting lens for the camera adapted to sight a pair of distant targets disposed in known positions on a rod of known length and having a known vertical interval therebetween, a measuring scale provided in the camera and in alignment with the lens, said scale indicating on the photographed film the intercept distant between the targets relative to the distant position from the camera, said scale simultaneously indicating on the film the intercept heighth interval between a plane parallel with the line of sight of the camera and the uppermost target, a compass card provided in the plate and connected with the bearing compass for simultaneous movement therewith, a window in the plate disclosing the bearing indications of the compass card, and means for simultaneously indicating on the film the bearing indications disclosed in the window for the target position.

4. A method for determining the variations in elevation of a traverse terrain which consists of photographing from a substantially horizontal plane the visual intercept distance of a pair of distant targets disposed in known positions on a rod of known length and having a known vertical interval there-between, simultaneously photographing the visual intercept distance between the uppermost target and that of a plane coincident with the line of sight of the photographing instrument, determining the values of the elevation and the distance in accordance with the following equations:

Elevation difference equals $H/i \times R$.
Distance equals $f/i \times R$, wherein:

$H$ equals the interval or distance measured on the film from the zero or instrument level line to the top target on the rod,
$i$ equals the intercept distance or interval intercepted on the film between the fixed targets,
$R$ equals the actual or fixed target interval measured between the targets on the rod,
$f$ is the focal length of the lens of the camera.

5. The method of surveying the elevations of a terrain which consists of photographing the visual intercept distance of a pair of distant targets having a known vertical interval therebetween, simultaneously photographing the visual intercept distance between the uppermost target and a horizontal plane coincident with the line of sight of the photographic instrument.

6. The method of surveying the elevations of a terrain which consists of photographing from a substantially level position the visual intercept distance of a pair of distant targets having a known vertical interval therebetween, simultaneously photographing the visual intercept distance between one of said targets and a horizontal plane passing through the line of sight of the photographing instrument.

7. A method for surveying the elevations of a terrain which consists of photographing from a substantially level position the visual intercept distance of a distant marked target having a known spacing thereon, simultaneously photographing the visual intercept distance between the uppermost marking of the target and a horizontal plane coincident with the line of sight of the photographing instrument.

8. A method of surveying the elevations of a terrain which consists of photographing from a substantially horizontal plane the visual intercept distance of a pair of upper and lower distant targets having a known vertical interval therebetween, simultaneously photographing the visual intercept distance between the uppermost target and a horizontal plane passing through the line of sight of the photographing instrument, simultaneously indicating onto the film the bearing indication of the distant position of the targets.

9. An apparatus for surveying elevations comprising a camera having a sighting lens, means for leveling the camera in a substantially horizontal line of sight, a rod of known length, a plurality of distant targets in known positions on the rod in the line of sight of the lens and having a known vertical interval therebetween, a scale having units of measure thereon provided in the camera and in alignment with the lens, said scale indicating on the photographed film the intercept interval between the targets relative to the distant position thereof, said scale simultaneously indicating on the film the intercept interval between a horizontal plane coincident with the line of sight of the camera and at least one of the targets at the distant position.

10. An apparatus for determining the variations in elevation in a traverse terrain comprising a camera having a lens for sighting the terrain in a substantially horizontal plane, a rod of known length, a plurality of distant targets in known positions on the rod in the line of sight of the lens and having a known spaced distance therebetween, measure means provided in the camera and in alignment with the lens, said means adapted to indicate on the exposed film the intercept interval between the targets relative to the distant position thereof, said means simultaneously indicating on the exposed film the intercept distance between at least one of the targets and a horizontal plane coincident with the line of sight of the camera.

WILLIS O. BAZHAW.

REFERENCES CITED

The following references are of record in the file of this patent:

UNITED STATES PATENTS

| Number | Name | Date |
|---|---|---|
| 34,608 | Atteneder | Mar. 4, 1862 |
| 1,283,172 | Haworth | Oct. 29, 1918 |
| 1,372,811 | Hall | Mar. 29, 1921 |
| 1,428,028 | Hadsel | Sept. 5, 1922 |
| 1,625,952 | Lucas | Apr. 26, 1927 |
| 1,653,585 | Pierce | Dec. 20, 1927 |
| 2,111,516 | Roux | Mar. 15, 1938 |
| 2,311,076 | O'Neal et al. | Feb. 16, 1943 |

FOREIGN PATENTS

| Number | Country | Date |
|---|---|---|
| 15,292/28 | Australia | Aug. 27, 1929 |
| 236,111 | Great Britain | July 2, 1925 |
| 464,433 | Germany | Aug. 17, 1928 |